US008972789B2

(12) United States Patent
Kamble et al.

(10) Patent No.: US 8,972,789 B2
(45) Date of Patent: Mar. 3, 2015

(54) DIAGNOSTIC SYSTEMS FOR DISTRIBUTED NETWORK

(75) Inventors: Keshav Kamble, Fremont, CA (US); Nandakumar Peethambaram, Santa Clara, CA (US); Abhijit Prabhakar Kumbhare, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/597,019

(22) Filed: Aug. 28, 2012

(65) Prior Publication Data

US 2014/0068338 A1    Mar. 6, 2014

(51) Int. Cl.
*G06F 11/00* (2006.01)

(52) U.S. Cl.
USPC ............... 714/37; 714/26; 370/216; 370/229

(58) Field of Classification Search
CPC ..... G06F 11/2257; G06F 11/30; G06F 11/34; G06F 11/3452; G06F 11/3476; G06F 2201/86
USPC .............. 714/25–27, 37, 43, 47.1, 47.2, 47.3; 370/216, 229
See application file for complete search history.

(56) References Cited

U.S. PATENT DOCUMENTS

| | | | |
|---|---|---|---|
| 6,012,152 A * | 1/2000 | Douik et al. ................. 714/26 |
| 6,233,449 B1 * | 5/2001 | Glitho et al. ................ 455/423 |
| 6,728,214 B1 * | 4/2004 | Hao et al. .................... 370/241 |
| 7,113,988 B2 | 9/2006 | Chirashnya et al. |
| 7,363,543 B2 * | 4/2008 | Peebles et al. ................ 714/26 |
| 8,612,802 B1 * | 12/2013 | Havemose .................... 714/26 |
| 8,656,226 B1 * | 2/2014 | Havemose .................. 714/47.3 |
| 2003/0135382 A1 * | 7/2003 | Marejka et al. .................. 705/1 |
| 2005/0240835 A1 | 10/2005 | Dragnea et al. |
| 2006/0168195 A1 | 7/2006 | Maturana et al. |
| 2009/0249129 A1 * | 10/2009 | Femia ............................ 714/47 |
| 2009/0265139 A1 | 10/2009 | Klein et al. |
| 2013/0047039 A1 * | 2/2013 | Manes et al. ................ 714/47.1 |

FOREIGN PATENT DOCUMENTS

WO    WO 2010112855 A1 *    10/2010

OTHER PUBLICATIONS

Combes, J. et al.; Distributed Time Division Switching Network Diagnostic Method, IP.com, May 1, 1984, pp. 6006-6011, vol. 05-84.

* cited by examiner

*Primary Examiner* — Scott Baderman
*Assistant Examiner* — Joseph Kudirka
(74) *Attorney, Agent, or Firm* — Shimokaji & Associates, P.C.

(57) ABSTRACT

A diagnostic system provides identification of symptoms in a distributed network and an engine for providing recommended rectification of error sources that correspond to the symptoms. The distributed network may be accessed for current statistics. Symptoms may be identified that correspond to the current statistics. A recommended course of action for the distributed network may be provided based on a predetermined list of courses of actions that correspond to rectifying the performance in the error sources.

17 Claims, 2 Drawing Sheets

DIAGNOSTIC SYSTEMS FOR DISTRIBUTED NETWORK

BACKGROUND

The present invention relates to network management, and more specifically, to diagnostic systems in distributed networks.

Network management typically involves an administrator analyzing network points for debugging and diagnosis of networks performance issues. For example, an administrator may check if traffic is balanced over servers in a switch or if latency is unusually high along a data path. For the administrator to diagnose and debug a performance issue, he or she typically has to log in to the switch under inspection and review data logs. If multiple switches on a network are being affected, then the administrator may need to log in to each switch and review the logs of each. The logs may show performance on a component by component basis. Additional information may include Boolean checks, for example, whether network components are operating within threshold criteria. In a distributed or scaled out network, this can mean physically inspecting several switching points for example, 128 switch boxes of multiple switches, and analyzing the data logs for diagnosis and debugging. Furthermore, the administrator may have to perform diagnosis based on multiple disparate parameters and issues.

SUMMARY

According to one embodiment of the present invention, a diagnostic system comprises a distributed network of switches and a symptom analysis engine in communication with the distributed network, the symptom analysis engine being configured to: receive current statistics about the distributed network, identify symptoms that correspond to the current statistics, and retrieve a predetermined list of actions rectifying the symptoms.

According to another embodiment of the present invention, a processor comprises a computer readable non-transitory memory having computer readable program code embodied therewith, the computer readable program code being configured to: identify current statistics of a distributed network as symptoms of underperformance in the network, determine that the current statistics are beyond operating parameters for the distributed network; identify one or more error sources that correspond to the symptoms; and provide a recommended course of action for the distributed network based on a course of actions that may rectify the error sources.

According to yet another embodiment of the present invention, a process of diagnosing faults in a distributed network system comprises retrieving current statistics from the distributed network; identifying current statistics showing underperformance in the distributed network; marking current statistics showing underperformance as symptoms; comparing the symptoms to a list of known symptoms; indentifying error sources that correspond to the symptoms; and providing a recommended rectification of the error sources.

According to still yet another embodiment of the present invention, a computer program product for diagnosing underperformance in a distributed network, the computer program product comprising a computer readable storage medium having computer readable program code embodied therewith, the computer readable program code being configured to: identify symptoms in the distributed network; search a relational knowledge database for error sources corresponding to the identified symptoms; access a list of potential rectifications corresponding to a predetermined list of actions that operate the error sources within acceptable operating parameters; and provide the list of potential rectifications.

DETAILED DESCRIPTION

Figure 1:
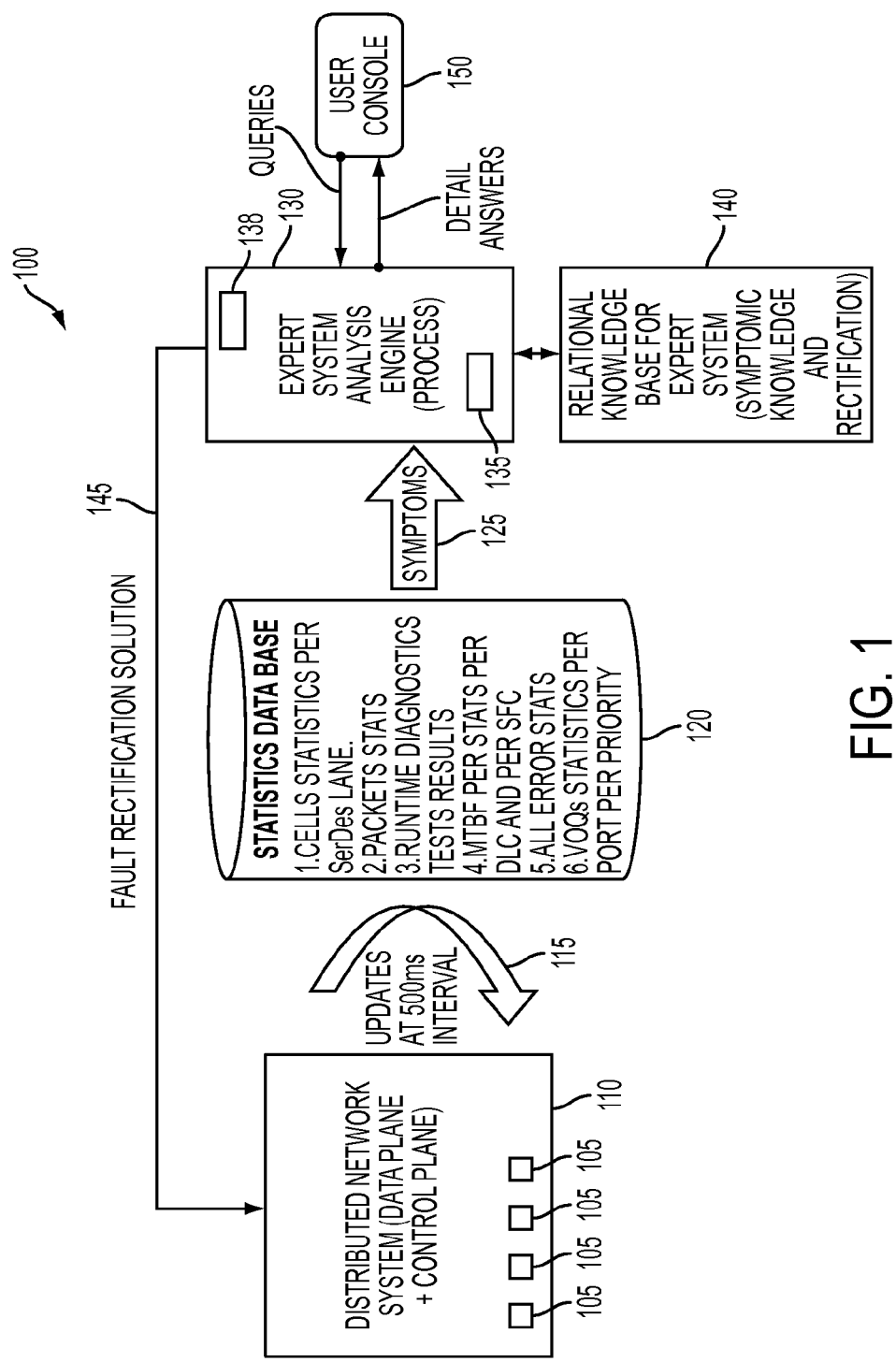
FIG. 1 is a block diagram of a diagnostic system according to an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a diagnostics system 100 for diagnosing faults or underperformance in a distributed network 110 is shown. The diagnostic system 100 may include the distributed network 110, a statistics database 120, a system analysis engine 130, and a relational knowledge database 140.

The distributed network 110 may include a plurality of autonomous switches 105. For sake of illustration, connections between the switches 105 have been omitted. The switches 105 may be connected together in a mesh network. In an exemplary embodiment, the switches 105 may form a non-blocking, distributed fabric.

The statistics database 120 may gather statistical data related to switching performance in the distributed network 110. The distributed network may be in communication with the statistics database 120. Periodically, the statistics database 120 may perform retrieval through a data bus 115 of current statistical data in the distributed network 110. For example, the statistics database 120 may retrieve the current operating statistics related to distributed network 110 every 500 ms. The operating statistics may be measured data and calculations related to switching performance and network traffic. The measured data and calculations may be from multiple switches. Upon each retrieval, the statistics database 120 may refresh its memory (not shown) of the statistical data from the distributed network 110 by storing the last batch of retrieved statistical performance data in the reserved sections of the system memory and replacing it with the most current retrieved statistical performance data. As used herein, symptoms may describe performance statistics that may indicate switching faults or underperformance in the distributed network 110 by singular or multiple components. A list of potential statistics gathered from the distributed network 110 is shown in the block representing the statistics database 120, however, it will be understood that other types of statistical data, queuing data, error statistics data and exception logs in control plane and exception statistics in data plane may be retrieved.

The system analysis engine 130 may be configured to analyze information from the statistics database 120 for predictive action. The system analysis engine 130 may include a processor 135 and a memory 138. The memory 138 may be either volatile or non-volatile memory storing operating behavior related to the distributed network 110. The memory 138 may archive the statistical data gathered by the statistical database 120 before the data is cleared. The archived statistical data may be used for comparing operation within the distributed network 110 over time. For sake of illustration, data transferred from the statistical database 120 to the system analysis engine 130 is shown as symptoms 125. However, it will be understood that all the statistical data from the database 120 may be transmitted to the system analysis engine 130 and considered a symptom until analyzed. Until determined otherwise, statistical data from database 120 may be considered candidate symptoms 125. The processor 135 may be configured to analyze a batch of candidate symptoms 125 and some of the previously stored symptom statistics in the system memory for potential diagnosis and recommended course of action. Prior to analyzing symptoms 125 for diagnosis, the processor 135 may review the memory 138 and determine if the batch of symptoms 125 exhibit behavior that is out of the norm or beyond threshold operating parameters for an application being executed within the network 110. For example, the distributed network 110 may show statistics that exhibit frequent traffic bursts that may be generally considered abnormal behavior. However, if the distributed network 110 is being operated under an application that typically employs traffic bursts, then the processor 135 may determine that the symptoms do not exhibit data that may require redress. If the processor 135 determines that the candidate symptoms 125 indeed exhibit performance statistics that are beyond a threshold performance, then the processor 135 may proceed to consult with the relational knowledge database 140 for diagnosis and recommended course of action. For example, if the symptoms 125 exhibit packet latency from two particular ports within a switching path, then the system analysis engine 130 may refer to the relational knowledge database 140 for potential causes of packet latency. Normal or abnormal operation in the distributed network may be determined by comparing statistics archived over a pre-set time frame or by comparing a predetermined number of statistical sets.

The relational knowledge database 140 may provide the system analysis engine 130 with both error mapping and troubleshooting guidelines. The relational knowledge database 140 may include a list of potential sources of error or underperformance in the distributed network 110. For example, the switching engine error statistics may show packet drops due to congestion, logs may show multiple link failures and the network administrator may observe excessive latency. In such link failures, the member data center switches get link oversubscriptions and therefore experience congestion. Due to congestion, the packets may be dropped. The target applications running on the networks start retransmitting their data packets, thus experiencing higher latency. Additional statistics gathered may relate to current status registers and exceptions in queues of switching ASICs of all switch members. The relational knowledge database 140 may also include a list of potential recommendations related to the sources of error. The recommendations may include suggested repairs, system modifications, or operational modifications. For example, recommended rectifications may include suggesting to the administrator to correct failed links, provision more switching bandwidth, or move application servers or virtual machines (VMs) generating data to another physical server on another appropriately provisioned network. The lists of error sources and recommendations may be human generated. The lists of error sources and recommendations may also be configured based on different applications being handled by the distributed network 110. Thus, a different set of lists may be stored for different applications.

An administrator interfacing with a user console 150 may query the system analysis engine 130 for the latest statistical data related to the distributed network 110. The system analysis engine 130 may search the relational knowledge database 140 for diagnosis of the symptoms 125. The system analysis engine 130 may provide the administrator with the potential sources of error and the potential actions rectifying the sources of error. Moreover, the system analysis engine 130 my analyze the potential sources of error and the potential rectification for predictive events that may occur due to following the recommendations or from inaction on the part of the administrator. The predictive action may be based on the processor's 135 simulating the effects the recommended courses of action (or inaction) may have on switches 105 within the distributed, non-blocking fabric environment. By using measured data and calculated data, the relationship between components contributing to error may be better identified and accuracy in the predictive actions may be improved. The administrator may use the identified sources of error, recommendations, and predictive action to send fault rectification solutions to the distributed network 110 as needed. For example, multiple switches may be identified as sources of error and rectification solutions for placing each switch back into acceptable operation performance may be provided.

Figure 2:
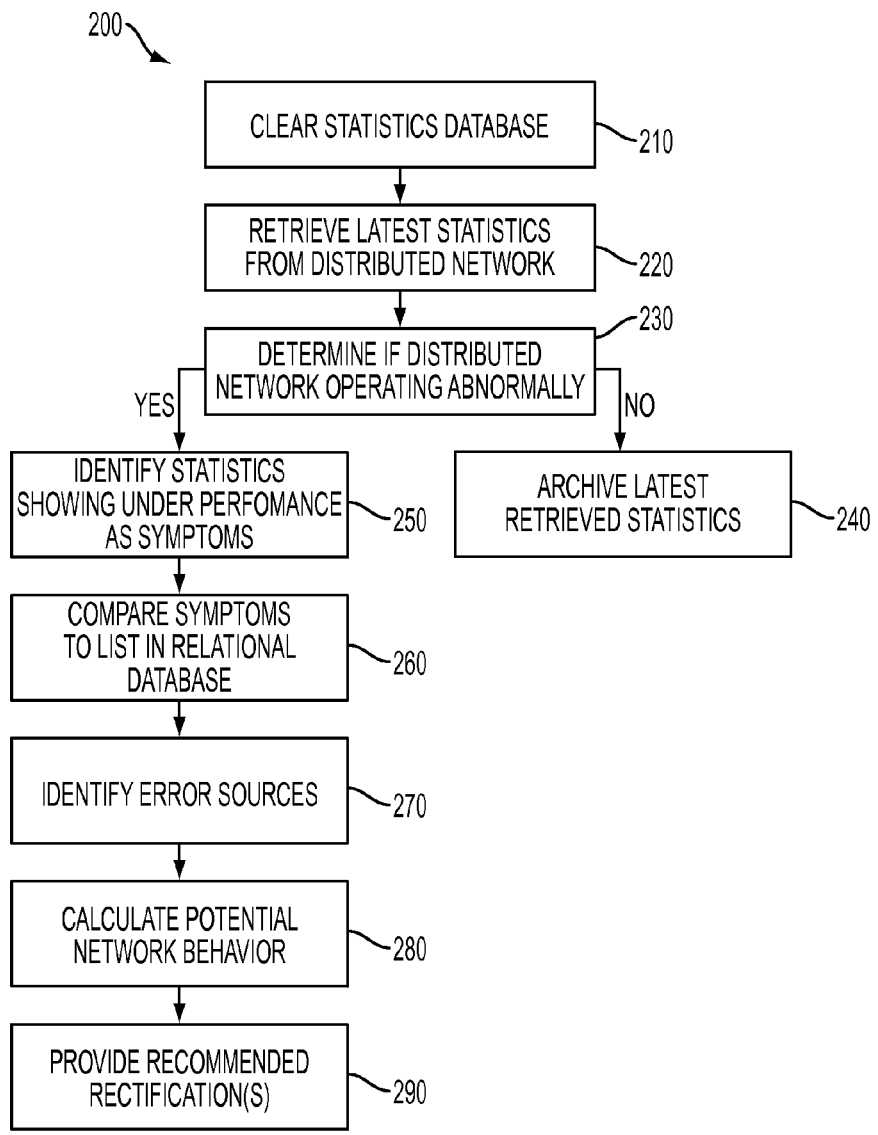
FIG. 2 is a flowchart of a process of diagnosing faults using the diagnostic system of FIG. 1 according to another exemplary embodiment.

A process 200 of diagnosing faults in the distributed network system 110 is shown in FIG. 2. In general, the process 200 diagnoses faults in a distributed network system by retrieving, for example: current values of various exceptions on member network switches; error statistics; various status register values; various queue statuses and threshold conditions; various protocol related errors; and trap and alarm conditions occurring in member network switches of the distributed network system. The statistics database 120 may be cleared 210. The statistics database 120 may retrieve 220 current performance statistics from the distributed network 110. The system analysis engine 130 may determine 230 whether the latest statistics show if the distributed network 110 is operating abnormally. If the distributed network 110 is operating normally, then the system analysis engine 130 may archive 240 the latest statistics for future comparison. If the distributed network 110 is operating abnormally, then the system analysis engine 130 may identify 250 which statistics show underperformance. The underperforming statistics may be marked as symptoms. The system analysis engine 130 may compare 260 the symptoms to a list of known symptoms in the relational database 140. The system analysis engine 130 may identify 270 error sources corresponding to the symptoms. The system analysis engine 130 may calculate 280 potential network behavior based on potential results of rectifying the error sources or based on inaction by the administrator. The system analysis engine 130 may provide 290 recommended rectifications to the administrator.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A diagnostic system, comprising:
   a distributed network of switches; and
   a symptom analysis engine in communication with the distributed network of switches, the symptom analysis engine being configured to:
   receive current statistics about the distributed network of switches,
   identify packet performance related symptoms that correspond to the current statistics,
   identify error sources that correspond to the symptoms,
   calculate predictive network packet behavior based on simulating courses of action on switches identified as the error sources, and retrieve a predetermined list of actions rectifying the packet performance related symptoms.

2. The diagnostic system of claim 1, including a relational knowledge database in communication with the symptom analysis engine, the relational knowledge database including a stored list of symptoms and a stored list of error sources corresponding to the identified packet performance related symptoms.

3. The diagnostic system of claim 1, wherein the symptom analysis engine is configured to determine whether the received current statistics exhibit abnormal operating behavior by the distributed network of switches prior to identifying packet performance related symptoms.

4. The diagnostic system of claim 1, including a statistical database in communication with the distributed network of switches, wherein the statistical database is configured to receive the current statistics from the distributed network of switches and provide the current statistics to the symptom analysis engine.

5. The diagnostic system of claim 4, wherein the statistical database periodically receives the current statistics.

6. The diagnostic system of claim 4, wherein the statistical database is refreshed periodically.

7. The diagnostic system of claim 2, wherein the predetermined list of actions is stored in the relational knowledge database.

8. A processor, comprising a computer readable non-transitory memory having computer readable program code embodied therewith, the computer readable program code being configured to:
identify current statistics related to packet performance in a distributed network of switches as symptoms of underperformance in the network;
determine that the current statistics related to packet performance are beyond operating parameters for the distributed network of switches;
identify one or more error sources that correspond to the symptoms;
calculate predictive network packet behavior based on simulating courses of action on switches identified as the one or more error sources; and
provide a recommended course of action for the distributed network of switches based on a course of actions that rectify the one or more error sources.

9. The processor of claim 8, including computer readable program code configured to calculate predictive behavior in the distributed network of switches based on analyzing potential results from rectifying the one or more error sources.

10. The processor of claim 8, including computer readable program code configured to compare the current statistics to archived statistics in determining whether the current statistics are beyond operating parameters.

11. A process of diagnosing faults in a distributed network system of switches, comprising:
retrieving current packet traffic statistics from the distributed network system of switches;
identifying current packet traffic statistics showing underperformance in the distributed network system of switches;
marking current packet traffic statistics showing underperformance as symptoms;
comparing the symptoms to a list of known symptoms;
identifying error sources that correspond to the symptoms;
calculating predictive network packet behavior based on simulating courses of action on switches identified as the error sources; and
providing a recommended rectification of the error sources based on the calculated predictive network packet behavior.

12. The process of claim 11, including storing the current packet traffic statistics to system memory prior to retrieving the current packet traffic statistics.

13. The process of claim 11, including determining whether the current packet traffic statistics show whether the distributed network system of switches is operating abnormally by analyzing various types of statistical data retrieved from the network system.

14. The process of claim 11, including:
archiving previously retrieved statistics about the distributed network system of switches; and
comparing the archived statistics to the current packet traffic statistics.

15. A computer program product for diagnosing underperformance in a distributed network of switches, the computer program product comprising a computer readable storage medium having computer readable program code embodied therewith, the computer readable program code being configured to:
identify packet latency related symptoms in the distributed network of switches;
search a relational knowledge database for error sources in the distributed network of switches corresponding to the identified packet latency related symptoms;
identify one or more error sources in the distributed network of switches corresponding to the packet latency related symptoms;
access a list of potential rectifications to be applied to the distributed network of switches and corresponding to a predetermined list of actions that operate the one or more error sources within acceptable operating parameters;
calculate predictive network packet behavior based on simulating courses of action on switches identified as the one or more error sources; and
provide the list of potential rectifications.

16. The computer program product of claim 15, the computer readable program code being configured to identify the packet latency related symptoms based on comparing current statistical performance data in the distributed network of switches with archived performance statistics.

17. The computer program product of claim 16, the computer readable program code being configured to:
refresh the current statistical performance data periodically;
compare the refreshed current statistical performance data with archived statistical performance data; and
determine whether an abnormal operation in the distributed network of switches is present based on the current statistical performance data operating beyond a threshold parameter when the current statistical performance data is compared to archived statistical performance data.

* * * * *